(12) United States Patent
Finch et al.

(10) Patent No.: US 11,067,445 B2
(45) Date of Patent: Jul. 20, 2021

(54) MONOCHROMATOR WITH STRAY LIGHT REDUCTION

(71) Applicant: THERMO ELECTRON SCIENTIFIC INSTRUMENTS LLC, Madison, WI (US)

(72) Inventors: William R. Finch, Fitchburg, WI (US); Francis J. Deck, Madison, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 0 days.

(21) Appl. No.: 16/522,599

(22) Filed: Jul. 25, 2019

(65) Prior Publication Data

US 2020/0041344 A1     Feb. 6, 2020

Related U.S. Application Data

(60) Provisional application No. 62/714,922, filed on Aug. 6, 2018.

(51) Int. Cl.
  *G01J 3/18* (2006.01)
  *G01J 3/02* (2006.01)
  *G01J 3/26* (2006.01)

(52) U.S. Cl.
  CPC ............... *G01J 3/18* (2013.01); *G01J 3/0262* (2013.01); *G01J 3/26* (2013.01); *G01J 2003/1814* (2013.01)

(58) Field of Classification Search
  CPC .......................................................... G01J 3/18
  USPC .......................................................... 356/331
  See application file for complete search history.

(56) References Cited

U.S. PATENT DOCUMENTS

| 2,750,836 A |   | 4/1955  | Watson et al. |
|---|---|---|---|
| 3,011,391 A |   | 12/1961 | Fastic et al. |
| 3,659,945 A | * | 5/1972  | Roche ................ G01J 3/18 356/334 |

(Continued)

FOREIGN PATENT DOCUMENTS

| EP | 0176826 A2      | 4/1986 |
|----|-----------------|--------|
| WO | WO-2006086382 A2 | 8/2006 |

OTHER PUBLICATIONS

International Search Report and Written Opinion dated Nov. 26, 2019, to PCT Application No. PCT/US2019/043531.

*Primary Examiner* — Tarifur R Chowdhury
*Assistant Examiner* — Omar H Nixon

(57) ABSTRACT

A stray light reducing apparatus includes a light source and an entrance slit positioned to pass through light from the light source. A first monochromator mirror is positioned to reflect light passed through the entrance slit. A diffractive surface is positioned to receive and diffract light reflected by the first monochromator mirror. A second monochromator mirror is positioned to reflect light diffracted by the diffractive surface. An exit slit is positioned to pass through light reflected by the second monochromator mirror. A cuvette is positioned to pass through light passed through the exit slit. A long-pass interference filter is positioned to receive light from the light source, reflect light that has a wavelength below a selected value, and pass through light having a wavelength above the selected value. A first sample detector is positioned to receive light reflected by the long-pass interference filter.

26 Claims, 9 Drawing Sheets

(56) References Cited

U.S. PATENT DOCUMENTS

| | | | |
|---|---|---|---|
| 3,822,941 A * | 7/1974 | Roche | G01J 3/18 |
| | | | 356/334 |
| 3,888,590 A * | 6/1975 | White | G01J 3/18 |
| | | | 356/333 |
| 4,842,357 A | 6/1989 | Doneen | |
| 5,192,981 A | 3/1993 | Slutter et al. | |
| 5,315,375 A | 5/1994 | Allen | |
| 5,461,477 A * | 10/1995 | Marinelli | G01J 3/2823 |
| | | | 250/343 |
| 6,414,753 B1 | 7/2002 | Davis et al. | |
| 7,091,653 B2 | 8/2006 | Ouderkirk et al. | |
| 7,245,072 B2 | 7/2007 | Ouderkirk et al. | |
| 7,978,324 B2 | 7/2011 | Pan et al. | |
| 8,208,147 B2 | 6/2012 | Myrick et al. | |
| 8,212,216 B2 | 7/2012 | Perkins et al. | |
| 8,379,199 B2 | 2/2013 | Freese et al. | |
| 8,441,710 B2 | 5/2013 | Wang et al. | |
| 9,146,192 B2 | 9/2015 | Some et al. | |
| 9,563,061 B2 | 2/2017 | Maiwald et al. | |
| 9,778,106 B2 | 10/2017 | Niggl et al. | |
| 2005/0286047 A1 * | 12/2005 | Boege | G01J 3/4406 |
| | | | 356/317 |
| 2007/0194239 A1 * | 8/2007 | McAllister | G01J 3/0229 |
| | | | 250/339.07 |
| 2008/0030728 A1 * | 2/2008 | Nguyen | G01J 3/0262 |
| | | | 356/328 |
| 2009/0103088 A1 * | 4/2009 | Delmas | G02B 27/0025 |
| | | | 356/328 |
| 2009/0213371 A1 | 8/2009 | Goodyer et al. | |
| 2014/0300897 A1 | 10/2014 | Treado et al. | |
| 2016/0123884 A1 | 5/2016 | Priore | |
| 2017/0075048 A1 | 3/2017 | Ave | |

* cited by examiner

MONOCHROMATOR WITH STRAY LIGHT REDUCTION

CROSS-REFERENCE TO RELATED APPLICATIONS

The present application is a claims the priority benefit of U.S. patent application Ser. No. 62/714,922, filed Aug. 6, 2018. The disclosures of the foregoing application is incorporated herein by reference.

FIELD

Aspects of this disclosure relate generally to a monochromator with stray light reduction, and more particularly, to a monochromator that reduces stray light with a long pass interference filter.

BACKGROUND

Monochromators are well known in the prior art. Their function is to isolate a selected wavelength of light from a source of illumination. The selected wavelength is used for analytical purposes such as analyzing the properties of a sample through which the light is passed.

Monochromators generally comprise a light source, an entrance slit for receiving light to be analyzed, means for separating the light into its individual wavelengths and an exit slit for selecting a desired component. Generally, monochromators of one type also include a mirror for receiving light from the entrance slit and collimating the light, a diffractive surface for dispersing the light into its individual components, and a focusing mirror for receiving those components and refocusing them for presentation at an exit slit. After passing through the exit slit, the light is passed through a sample to be analyzed and directed to a detector to analyze the light. One type of monochromator that has been known in the art is a Czerny-Turner Monochromator. One such Czerny-Turner Monochromator is described in U.S. Pat. No. 5,192,981, the disclosure of which is incorporated herein in its entirety by reference. Additional monochromators are described in U.S. Pat. Nos. 2,750,836 and 3,011,391, both issued to Fastie, the disclosures of which are incorporated herein in their entirety by reference.

When the monochromator is used in spectroscopy, the amount of light absorption at a particular wavelength of light allows a chemist to determine how much of a particular chemical, enzyme, element, or compound is in the sample being measured. The sample is illuminated with monochromatic light, and light is either absorbed or transmitted according to the presence of a given molecular compound with the proper energy levels proportional to the wavelength of illumination. The resulting absorbance (optical density) or transmittance of the sample is measured. This seemingly simple procedure can present many challenges for the electro-optical designer, who must consider the light source, light transmission medium, spectral separation method, and finally detection requirements.

The light source used is usually a broad-spectrum source, such as the traditional two-lamp tungsten-halogen and deuterium system, or xenon flash lamp or white light emitting diodes. In a monochromator configuration, the light is first separated from the broadband source into its spectral elements, and then the monochromatic light is focused onto the sample of interest prior to detection at a detector. In a monochromator, it is desirable to have light of only one wavelength pass through the exit slit and to the detector.

Sources of stray light or stray radiant energy (SRE) in a monochromator include beam re-diffraction, second and third order energy from the grating, and general energy "glow" internal to monochromator surface reflections.

Stray light from multiple orders can be suppressed with second-order long-pass filters, and re-diffraction has been solved by either using the Cary principle to design a monochromator, or using the out of plane method described in U.S. Pat. No. 6,414,753, the disclosure of which is incorporated herein in its entirety by reference. General "glow" is more difficult, as it would require short-pass filters in the UV range, which are not readily available nor economically feasible. This general "glow" source of stray light results in reduced performance of the monochromator.

The stray light can be reduced by providing multiple monochromators in series. Some arrangements use two full monochromators in series, while some use a pre-selector monochromator in "front' of a full monochromator. Both arrangements are expensive due to the extra optics and drive components, and are also necessarily lossy from an energy perspective.

It would be desirable to provide an apparatus to reduce stray light in a monochromator that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

SUMMARY

In accordance with a first aspect, a stray light reducing apparatus includes a light source and an entrance slit positioned to pass through light from the light source. A first monochromator mirror is positioned to reflect light passed through the entrance slit. A diffractive surface is positioned to receive and diffract light reflected by the first monochromator mirror. A second monochromator mirror is positioned to reflect light diffracted by the diffractive surface. An exit slit is positioned to pass through light reflected by the second monochromator mirror. A cuvette is positioned to pass through light passed through the exit slit. A long-pass interference filter is positioned to receive light from the light source, reflect light that has a wavelength below a selected value, and pass through light having a wavelength above the selected value. A first sample detector is positioned to receive light reflected by the long-pass interference filter.

In accordance with another aspect, a monochromator includes a housing, a light source positioned in the housing, and a source mirror positioned to reflect light from the light source. An entrance slit is positioned to pass through light reflected by the source mirror. A first monochromator mirror is positioned to reflect light passed through the entrance slit. A diffractive surface is positioned to receive and diffract light reflected by the first monochromator mirror. A second monochromator mirror is positioned to reflect light diffracted by the diffractive surface. An exit slit is positioned to pass through light reflected by the second monochromator mirror. A sample mirror is positioned to reflect light passed through the exit slit. A cuvette is positioned to pass through light reflected by the sample mirror. A long-pass interference filter is positioned to receive light from the light source, reflect light that has a wavelength below a selected value, and pass through light having a wavelength above the selected value. A first sample detector is positioned to receive light reflected by the long-pass interference filter.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
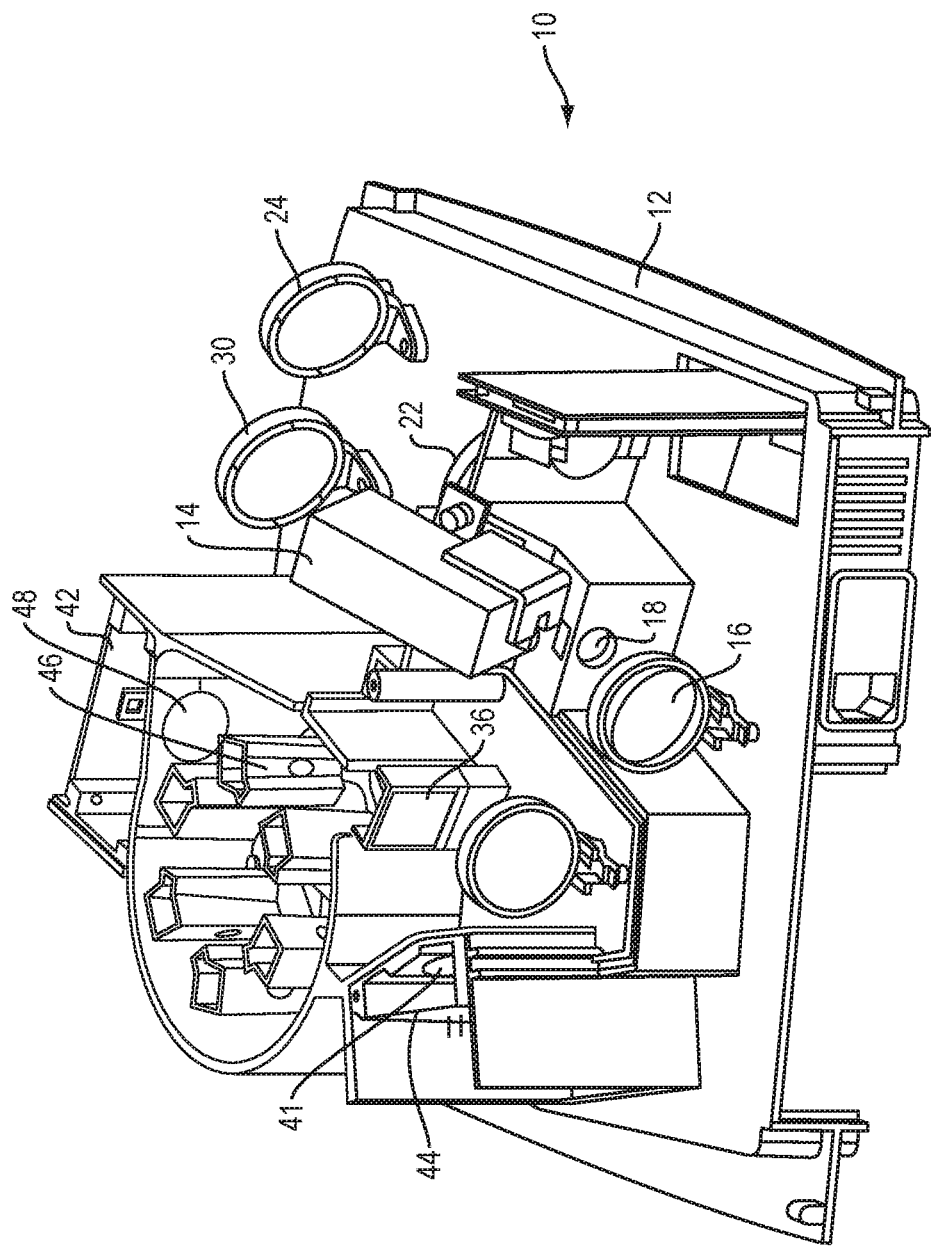
FIG. 1 is a perspective view of an interior of a prior art monochromator.

The figures referred to above are not drawn necessarily to scale, should be understood to provide a representation of particular embodiments, and are merely conceptual in nature and illustrative of the principles involved. Some features of the stray light reduction apparatus depicted in the drawings have been enlarged or distorted relative to others to facilitate explanation and understanding. The same reference numbers are used in the drawings for similar or identical components and features shown in various alternative embodiments. Stray light reduction apparatuses as disclosed herein would have configurations and components determined, in part, by the intended application and environment in which they are used.

DETAILED DESCRIPTION OF EMBODIMENTS

Figure 2:
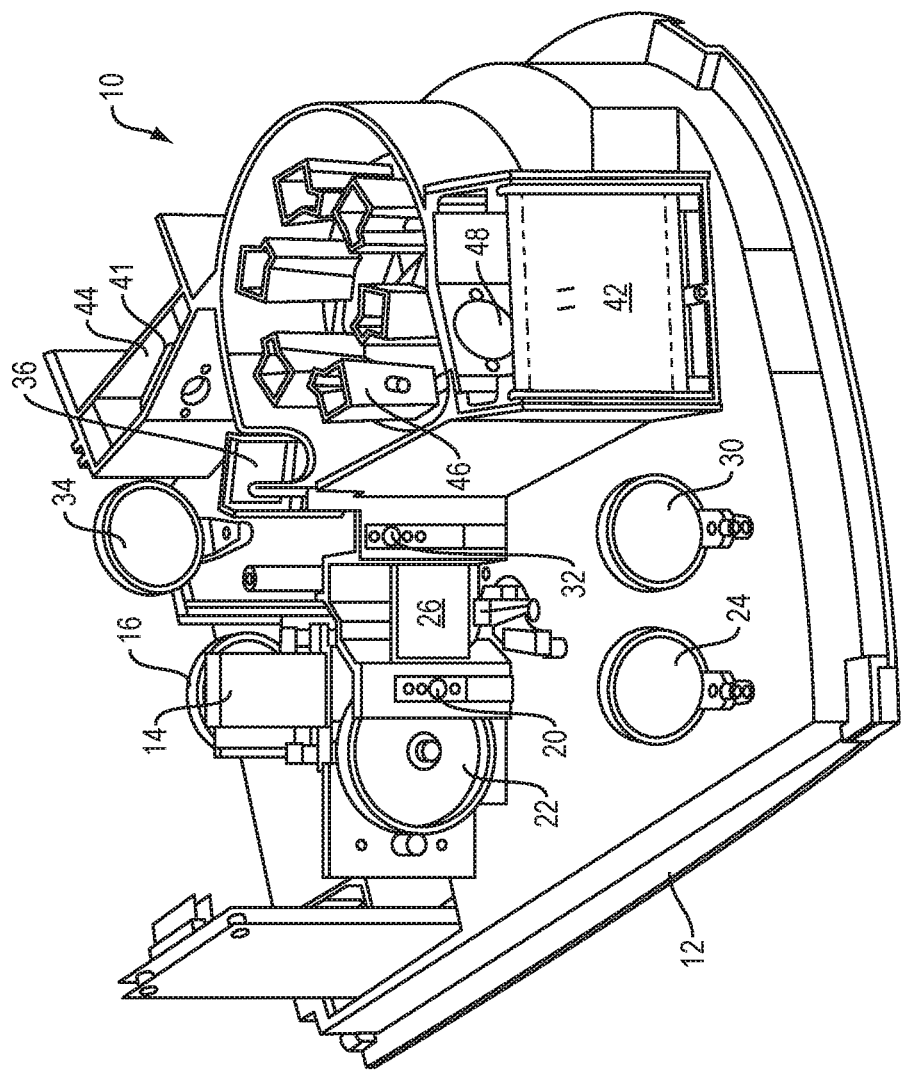
FIG. 2 is a front perspective view of the prior art monochromator of FIG. 1.
Figure 3:
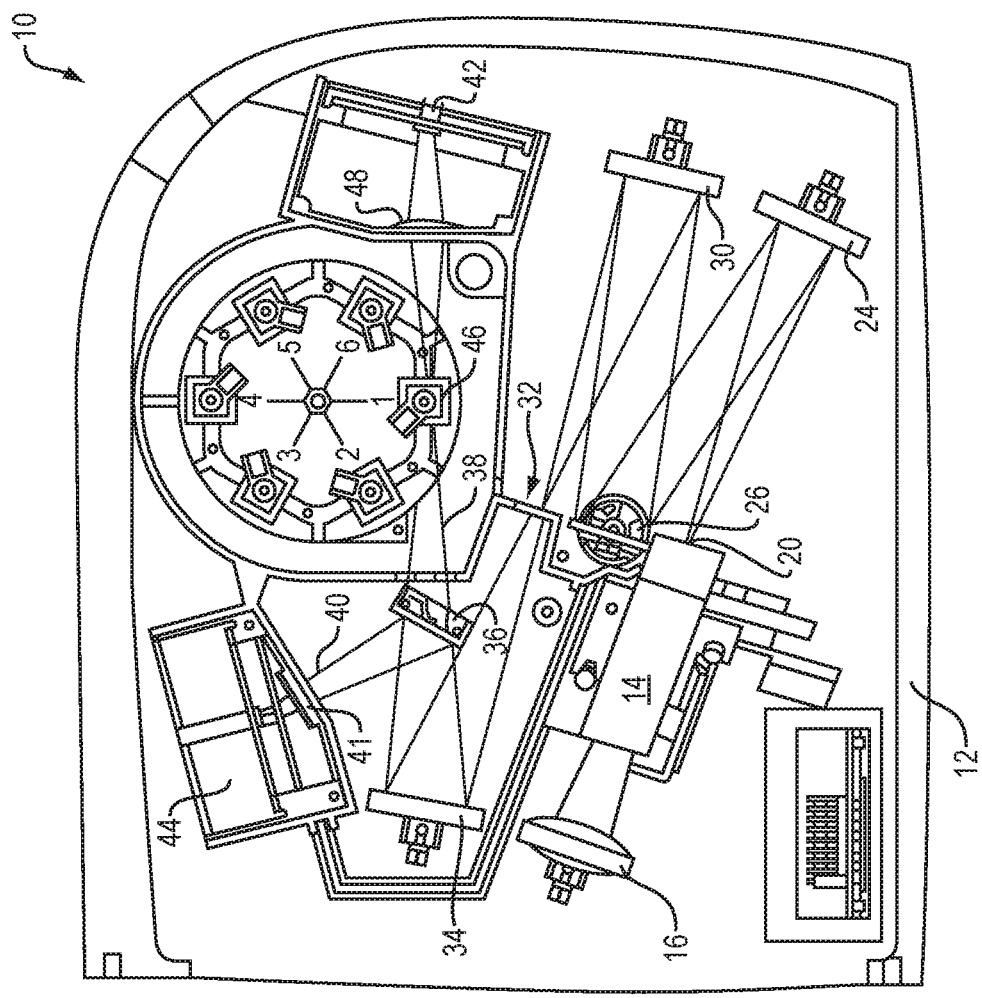
FIG. 3 is a top view of the prior art monochromator of FIG. 1.

Referring to FIGS. 1-3, a prior art monochromator 10 includes a housing 12. For illustration purposes, only the base of housing 12 is shown in the drawings, it being understood that housing 12 encloses the entire monochromator 10 to prevent external light from entering. A light source 14 is provided within housing 12. In certain embodiments, light source 14 may be a xenon flash light source, although other light sources suitable for use with monochromators are known to those of skill in the art. Light source 14 directs light to a source mirror 16. Light is reflected from source mirror 16 and is directed through an aperture stop 18 and an entrance slit 20. Light source 14 may be in the same vertical plane as mirror 16 and an axis through the center of entrance slit 20 to limit aberrations and to optimize the footprint of monochromator 10. Mirror 16 may be a spherical or aspherical mirror that focuses light on entrance slit 20.

Light passes through a filter 22 and then through the entrance slit 20. Filter 22 is selected as a function of analytical wavelength, and blocks light of particular wavelengths, of which second or third order diffractions in monochromator 10 can adversely affect light of the chosen analytical wavelength unless filtered. The light then strikes a first monochromator mirror 24. First monochromator mirror 24 may be placed so that the entrance slit 20 is at the focal point of first monochromator mirror 24. The light is collimated by first monochromator mirror 24 and is reflected to a diffractive surface 26. In certain embodiments, diffractive surface 26 is a Sheridon grating. A Sheridon grating has lower stray light characteristics than ruled gratings. It is to be appreciated that other types of gratings can also be used in monochromator 10.

Diffractive surface 26 splits the light into individual wavelength components and directs these components to a second monochromator mirror 30. Second monochromator mirror 30 reflects the diffracted light to an exit slit 32. Exit slit 32 may be located at the focal point of the second monochromator mirror 30. Because it is desirable to have only a single preselected wavelength of light pass through exit slit 32, diffractive surface 26 may be rotatable about a vertical axis. By varying the position of diffractive surface 26, the wavelength of light passing through the exit slit 32 is selected. After passing through exit slit 32, light strikes and is reflected by a sample mirror 34, and may be directed to a beam splitter 36. A portion of the light passes through beam splitter 36 and another portion is reflected from beam splitter 36 as is known. The portion of light 38 that passes through beam splitter 36 is directed to a cuvette 46, which holds a sample (not shown). Sample mirror 34 is located such that it images exit slit 32 at the center of the sample. After passing through cuvette 46 and the sample, light 38 is directed through a sample lens 48 to a first sample detector 42. The other portion of light 40 reflected from beam splitter 36 may be directed through a second lens 41 to a detector 44, referred to herein as a first reference detector 44. The light striking first sample detector 42 and first reference detector 44 can be compared to analyze the properties of the sample, as is known.

Figure 4:
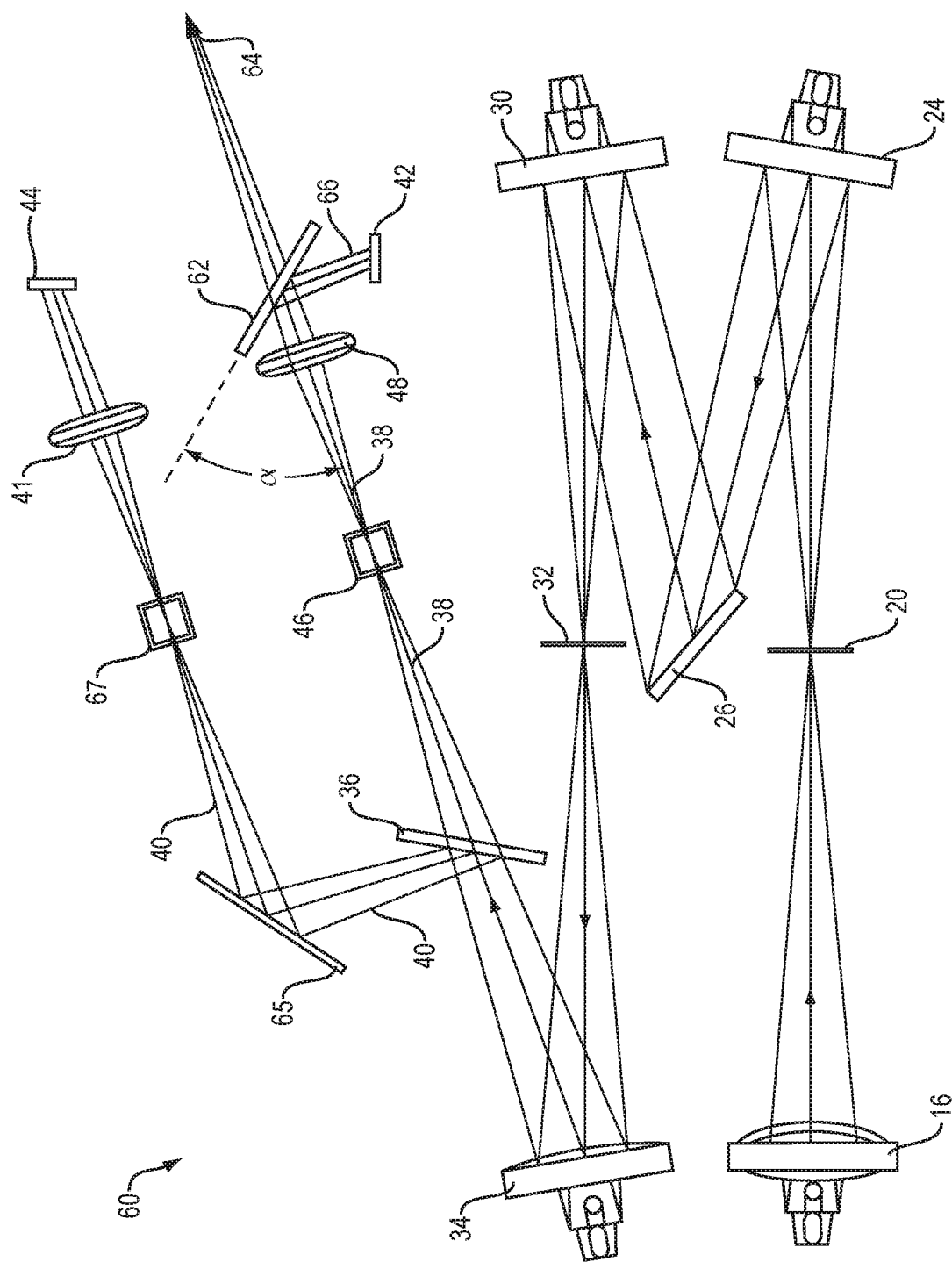
FIG. 4 is a schematic view showing a light path through a monochromator with a long-pass interference filter.

A first embodiment of a monochromator 60 is illustrated schematically in FIG. 4. Many of the elements of monochromator 60 are similar to that of the Czerny-Turner monochromator 10 of the prior art shown in FIGS. 1-3. The housing for monochromator 60 is not shown here for clarity reasons. Although FIGS. 1-3 illustrate a Czerny-Turner type monochromator, it is to be appreciated that the present disclosure can be used with other types of monochromators as well.

In the embodiment of FIG. 4, a long-pass filter 62 is positioned downstream of the sample and serves to transmit light having longer wavelengths, while reflecting light having shorter wavelengths. Specifically, the long-pass filter serves to transmit or pass through light having a wavelength longer than a selected value and reflect light having a wavelength shorter than the selected value. Exemplary filters to accomplish this filtering and reflective capability are colored-glass alternative (CGA) filters provided by Newport Corporation of Irvine, Calif. Such filters are referred to herein as "long-pass interference filters."

As illustrated here, light from light source 14 (not shown) is directed toward and is reflected by source mirror 16 through monochromator 60. Long-pass interference filter 62 is positioned along the path of light 38 downstream of sample 46 and sample lens 48, and transmits longer wavelength light 64 and reflects shorter wavelength light 66 to first sample detector 42.

The reflected shorter wavelength light 66 travels to and strikes first sample detector 42, allowing the user to analyze the properties of sample 46. In certain embodiments, a target wavelength of the light to be directed to first sample detector 42 is <350 nm. Thus, in such an embodiment, a long-pass interference filter 62 that transmits light having a wavelength of >350 nm and reflects light having a wavelength <350 nm is selected.

As seen in FIG. 4, long-pass interference filter 62 is positioned at an angle α with respect to the path of travel of light 38. In certain embodiments, angle α is approximately 45° so that light 66 is reflected approximately 90° with respect to the path of travel of light 38. It is to be appreciated that in other embodiments angle α can be greater than or less than 45°. Other suitable values for angle α will become readily apparent to those skilled in the art, given the benefit of this disclosure.

The term "approximately" as used herein is meant to mean close to, or about a particular value, within the constraints of sensible, commercial engineering objectives, costs, manufacturing tolerances, and capabilities in the field of monochromator manufacturing and use. Similarly, the term "substantially" as used herein is meant to mean mostly, or almost the same as, within the constraints of sensible, commercial engineering objectives, costs, manufacturing tolerances, and capabilities.

Thus, as can be seen here, long-pass interference filter 62 serves to provide improved performance for monochromator 60 by rejecting the out of band long wavelength light, or "glow", and providing the desired light to first sample detector 42.

The light 40 passing through beamsplitter 36 may be reflected by a reference mirror 65 and then through a reference cuvette 67. From reference cuvette 67, light 40 then passes through lens 41 and on to first reference detector 44. Cuvette 67 does not contain an actual sample, or analyte, but may contain a solvent, which is typically a low-absorbance substance.

Figure 5:
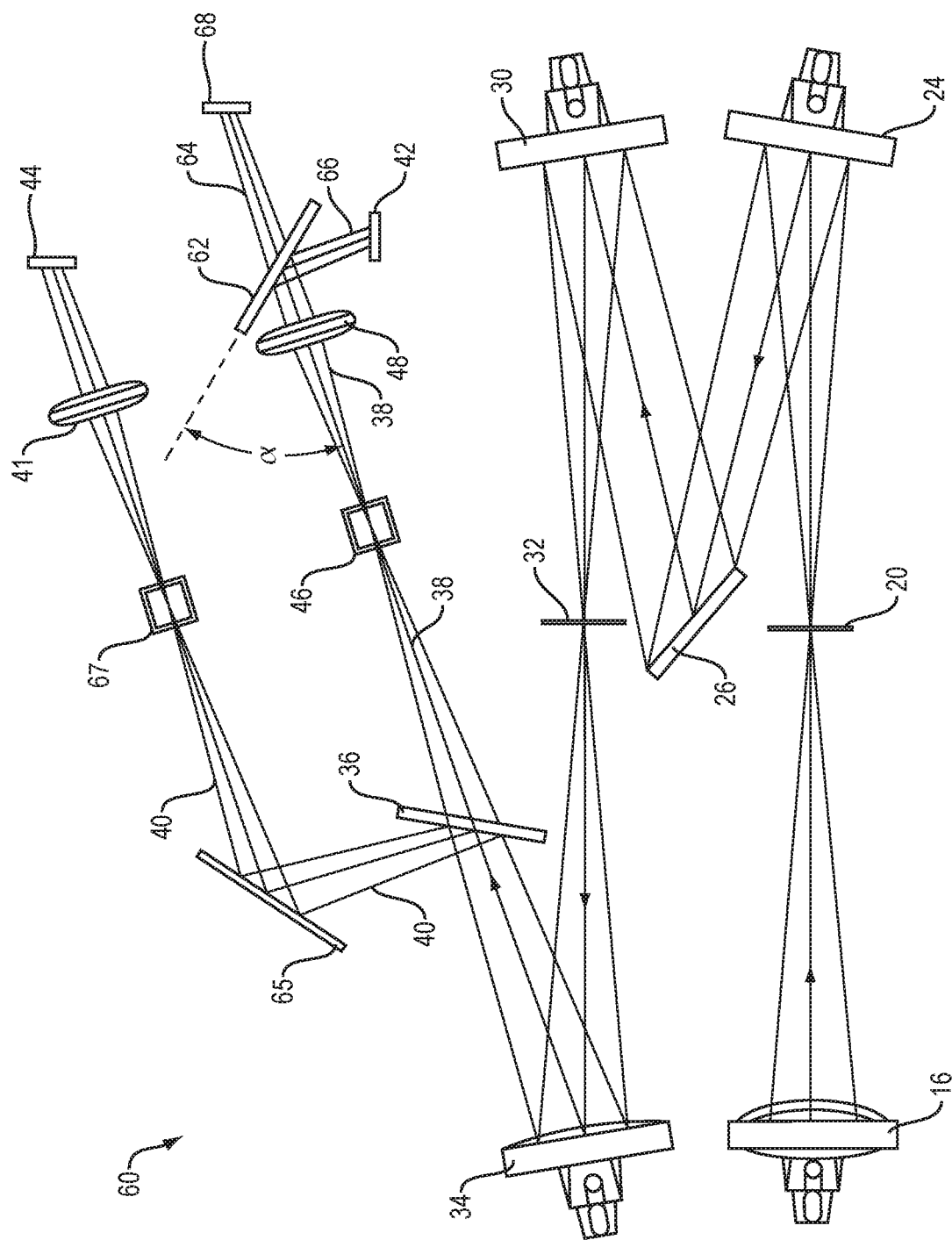
FIG. 5 is a schematic view showing a light path through an alternative embodiment of a monochromator with a long-pass interference filter.

A further embodiment is illustrated in FIG. 5. In this embodiment, a second sample detector 68 is positioned along the path of the longer wavelength light 64. Thus, in such an embodiment, the sample could be analyzed using both long wavelength light with second sample detector 68, and short wavelength light with first sample detector 42.

Figure 6:
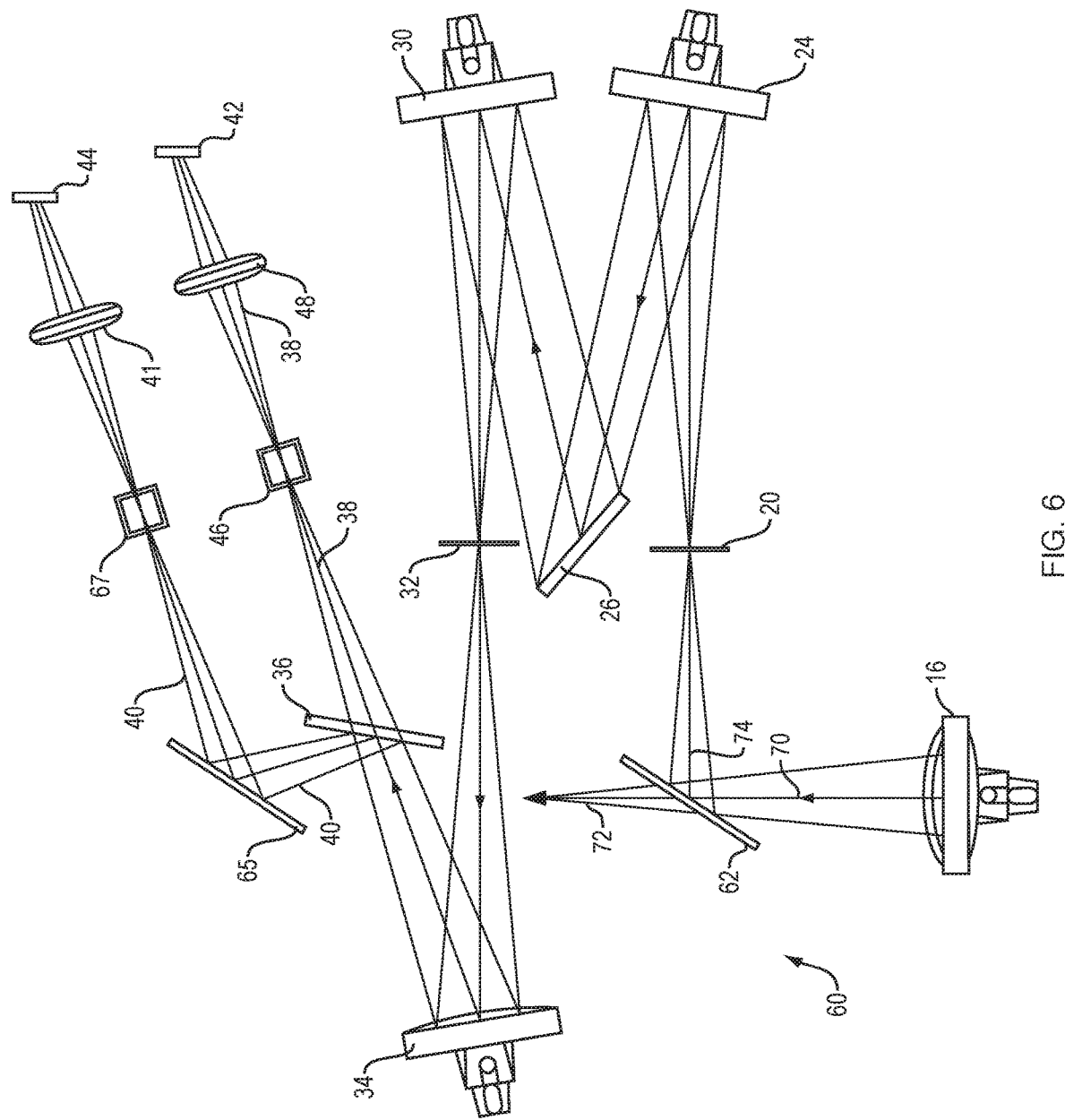
FIG. 6 is a schematic view showing a light path through another alternative embodiment of a monochromator with a long-pass interference filter.

Another embodiment is illustrated in FIG. 6. In this embodiment, long-pass interference filter 62 is positioned upstream of entrance slit 20. In order to implement such an embodiment, the path of travel of the incoming light from light source 14 (not shown) must be reoriented. As illustrated here, long-pass interference filter 62 is positioned downstream of a path of light 70 exiting source mirror 16. A portion of light 72 having a longer wavelength passes through long-pass interference filter 62, while a portion of light 74 having a shorter wavelength is reflected by long-pass interference filter 62 and is directed to entrance slit 20. The light then travels through the remaining elements of monochromator 60 to first sample detector 42.

As with the embodiments discussed above, long-pass interference filter 62 is positioned at angle α with respect to the path of travel of light 70. Although angle α as illustrated here is 45°, as discussed above, it may be greater than or less than 45°.

Figure 7:
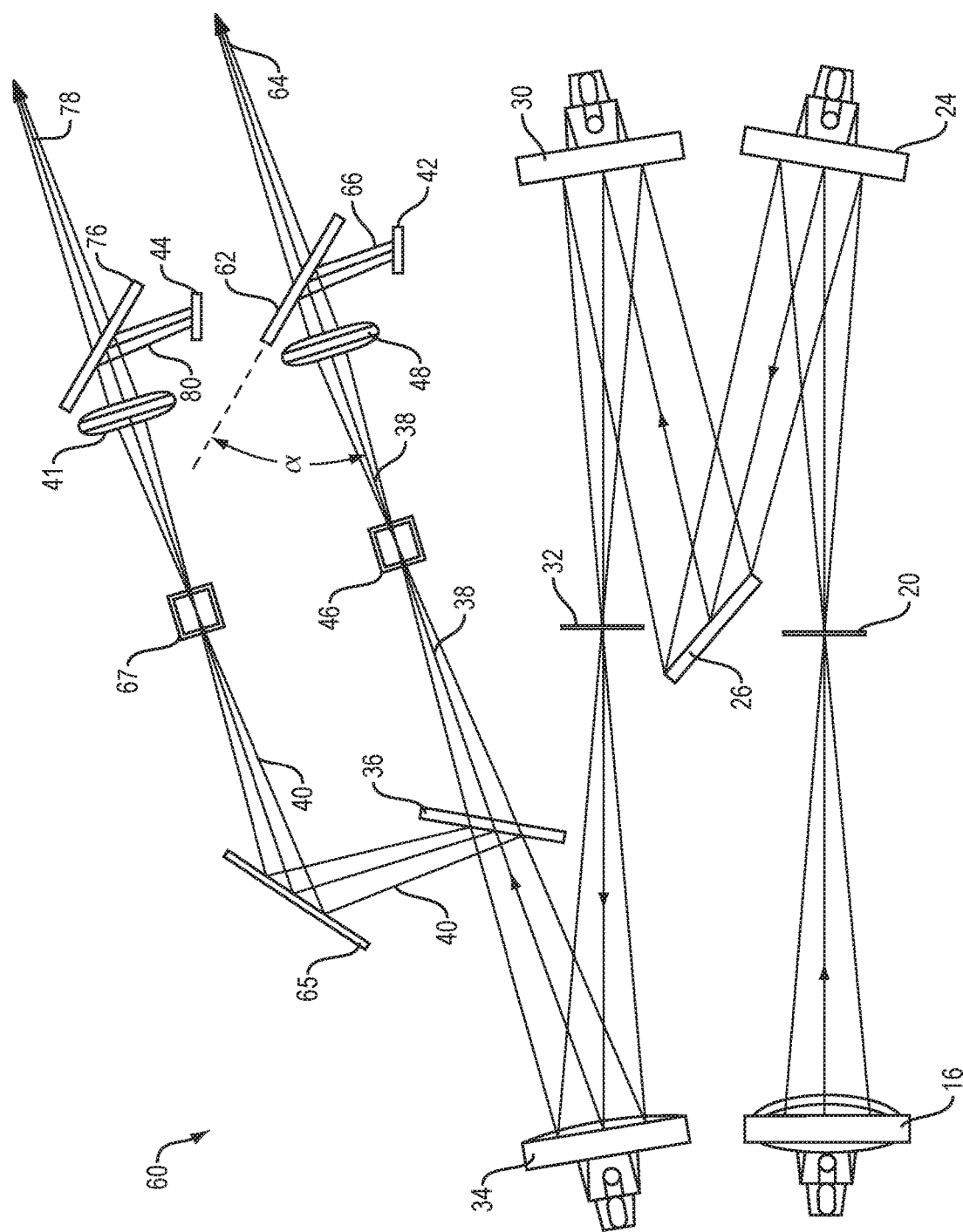
FIG. 7 is a schematic view showing a light path through yet another alternative embodiment of a monochromator with a long-pass interference filter.

An alternative embodiment is illustrated in FIG. 7, in which a reference long-pass interference filter 76 is positioned upstream of the first reference detector 44. In this embodiment, reference long-pass interference filter 76 is positioned between lens 41 and first reference detector 44.

In certain embodiments, long-pass interference filter 62 and reference long-pass interference filter 76 are each configured to pass through and reflect light having the same range of wavelengths. Thus, in such an embodiment, both first sample detector 42 and first reference detector 44 receive light of the same wavelength range.

Figure 8:
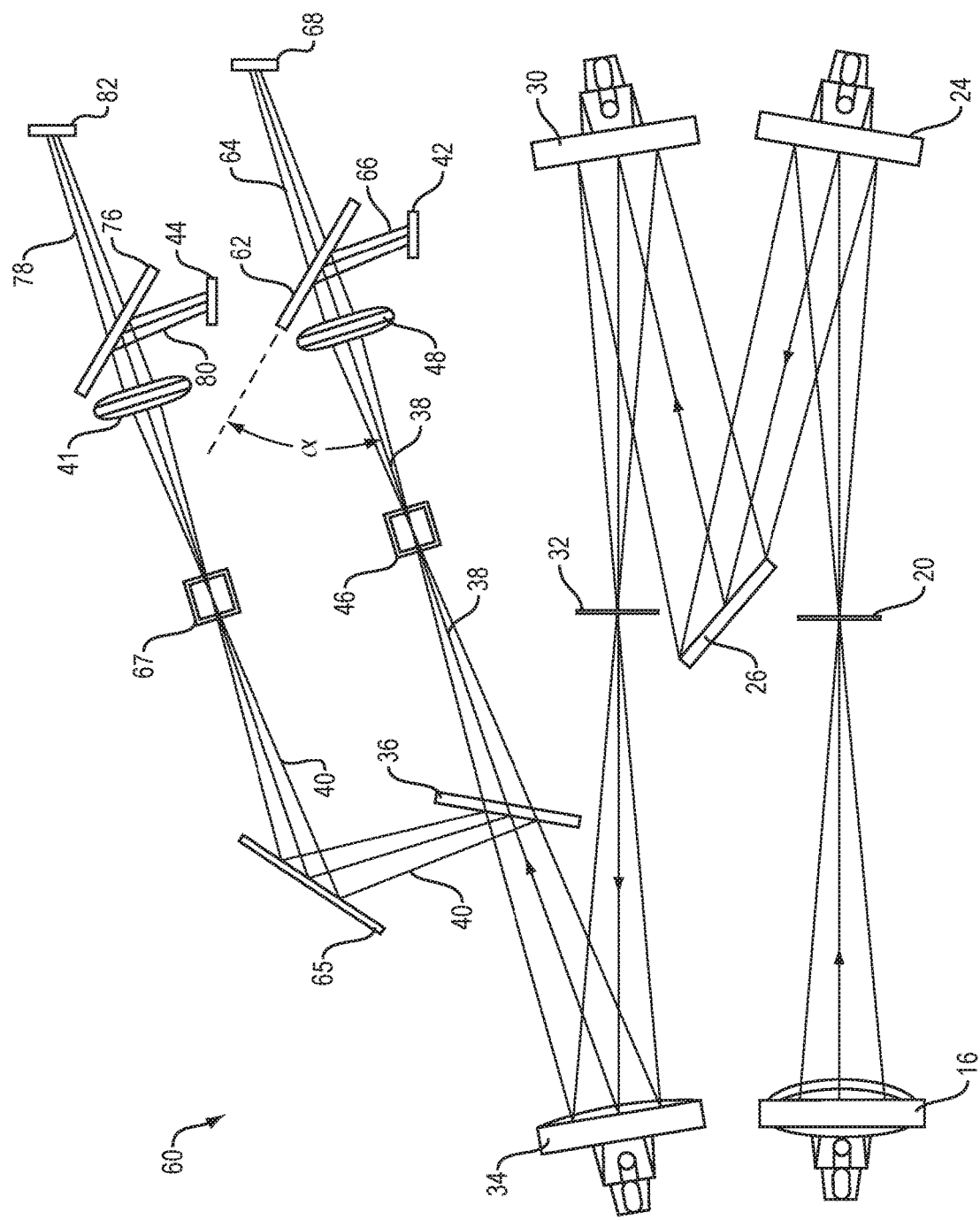
FIG. 8 is a schematic view showing a light path through a further alternative embodiment of a monochromator with a long-pass interference filter.

Another embodiment is shown in FIG. 8, and includes first sample detector 42, which receives the light 66 reflected by long-pass interference filter 62, as well as a second sample detector 68, which receives the light 64 that passes through long-pass interference filter 62. This embodiment also includes first reference detector 44 that receives the light 80 reflected by reference long-pass interference filter 76, as well as a second reference detector 82, which receives the light 78 that passes through reference long-pass interference filter 76.

Thus, in this embodiment, sample 46 can be analyzed using shorter wavelength light that is reflected by long-pass interference filter 62 and strikes first sample detector 42, and this data can be compared to reference values based on shorter wavelength light that is reflected by reference long-pass interference filter 76 and strikes first reference detector 44.

Additionally, in this embodiment, sample 46 can be analyzed using longer wavelength light 64 that passes through long-pass interference filter 62 and strikes second sample detector 68, and this data can be compared to reference values based on longer wavelength light that passes through reference long-pass interference filter 76 and strikes second reference detector 82.

Figure 9:
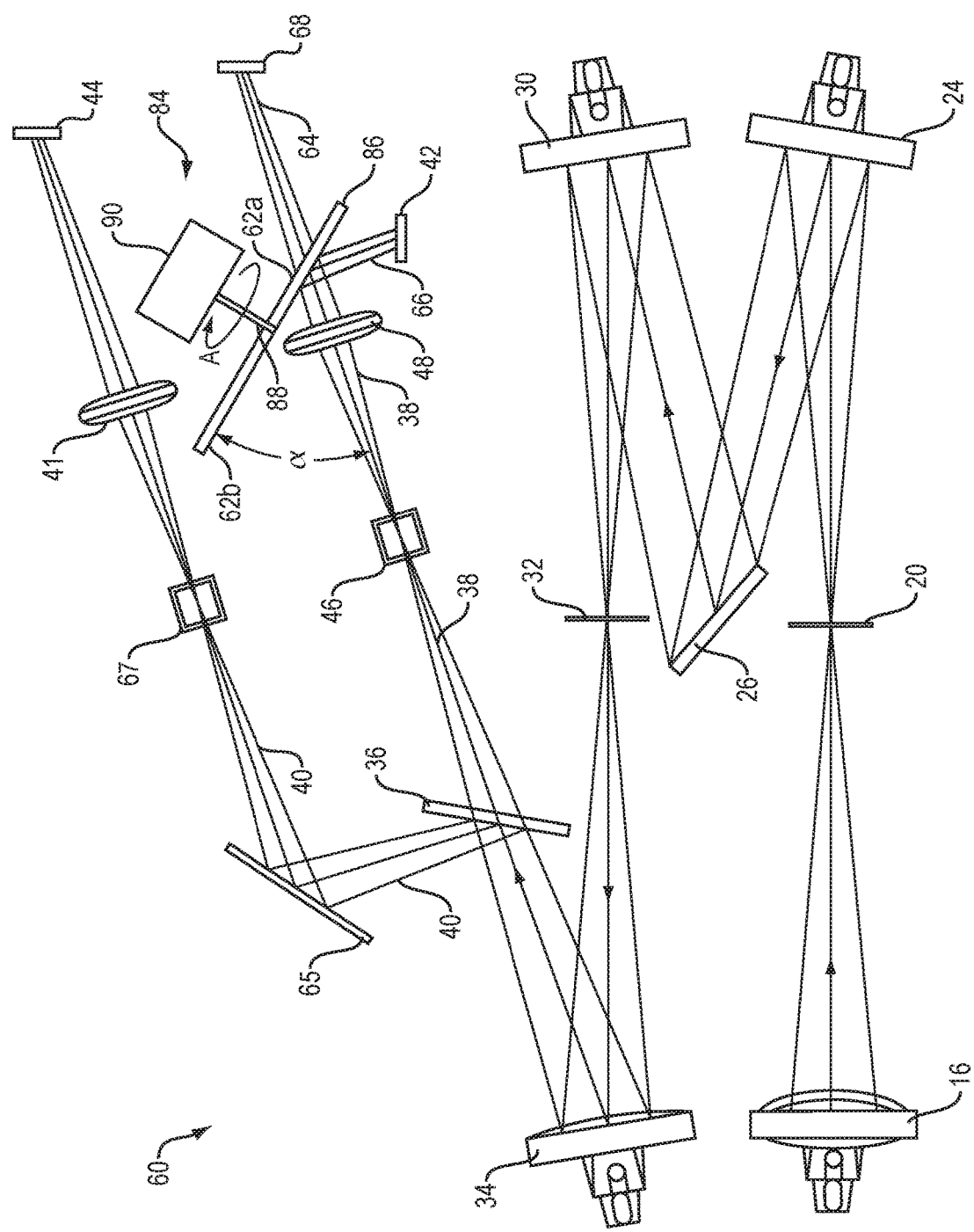
FIG. 9 is a schematic view showing a light path through a monochromator having a plurality of long-pass interference filters.

An alternative embodiment is seen in FIG. 9, in which long-pass interference filter 62 is part of a filter assembly 84 that includes a plurality of long-pass interference filters. Each of the long-pass interference filters is configured to reflect a selected range of wavelengths so that by selecting a particular wavelength range, the analysis of the sample can be more refined and selectively optimized. For example, one filter could be configured for between approximately 190 nm and approximately 230 nm, another for between approximately 230 nm and approximately 270 nm, another for between approximately 270 nm and approximately 350 nm, and so on.

Filter assembly 84 can take the form of a rotatable wheel, or a sliding mechanism, or any other assembly that allows multiple long-pass interference filters to be interchangeably positioned along the path of light traveling through monochromator 60.

In the illustrated embodiment, filter assembly 84 is positioned along the path of light 38 traveling out of sample lens 48 and toward first sample detector 42. It is to be appreciated that filter assembly 84 can be positioned at different locations within monochromator 60.

In certain embodiments, as illustrated in FIG. 9, filter assembly 84 includes a rotatable filter wheel 86. A plurality of long-pass interference filters 62A-62N (with only filters 62A and 62B being shown here) are positioned around filter wheel 86. When filter wheel 86 is rotated in the direction of arrow A about a shaft 88, a selected long-pass interference filter of filters 62A-62N can be positioned in-line with light 38. Light 38 will naturally strike that particular filter and will be reflected and passed through in accordance with the wavelength characteristics of that particular filter. A motor 90 may be used to rotate shaft 88 and, therefore, filter wheel 86.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A monochromator comprising:
   a light source;
   an entrance slit positioned to pass through light from the light source;
   a first monochromator mirror positioned to reflect light passed through the entrance slit;
   a diffractive surface positioned to receive and diffract light reflected by the first monochromator mirror;
   a second monochromator mirror positioned to reflect light diffracted by the diffractive surface;
   an exit slit positioned to pass through light reflected by the second monochromator mirror;
   a cuvette positioned to pass through light passed through the exit slit;
   a long-pass interference filter positioned to receive light from the light source, reflect light that has a wavelength below a selected value, and pass through light having a wavelength above the selected value; and
   a first sample detector positioned to receive light reflected by the long-pass interference filter.

2. The monochromator of claim 1, further comprising a source mirror positioned to reflect light from the light source toward the entrance slit.

3. The monochromator of claim 1, further comprising a sample mirror positioned to reflect light from the exit slit toward the cuvette.

4. The monochromator of claim 1, further comprising a sample lens positioned between the cuvette and the long-pass interference filter.

5. The monochromator of claim 1, further comprising a beam splitter positioned to receive light passed through the exit slit.

6. The monochromator of claim 5, further comprising a first reference detector positioned to receive light reflected by the beam splitter.

7. The monochromator of claim 6, further comprising a reference long-pass interference filter positioned between the beam splitter and the first reference detector.

8. The monochromator of claim 6, further comprising a reference lens positioned between the beam splitter and the first reference detector.

9. The monochromator of claim 6, further comprising a reference cuvette positioned between the beam splitter and the first reference detector.

10. The monochromator of claim 6, further comprising a second reference detector positioned to receive light passed through the reference long-pass interference filter.

11. The monochromator of claim 1, wherein the long-pass interference filter is positioned between the cuvette and the first sample detector.

12. The monochromator of claim 11, further comprising a sample lens positioned between the cuvette and the long-pass interference filter.

13. The monochromator of claim 11, further comprising a second sample detector positioned to receive light passed through the long-pass interference filter.

14. The monochromator of claim 11, wherein the long-pass interference filter is positioned at an angle with respect to the light received by the long-pass interference filter.

15. The monochromator of claim 14, wherein the angle is approximately 45°.

16. The monochromator of claim 1, wherein the long-pass interference filter is positioned between the light source and the entrance slit.

17. The monochromator of claim 16, further comprising a source mirror positioned between the light source and the long-pass interference filter.

18. The monochromator of claim 1, further comprising a filter assembly, the filter assembly including the long-pass interference filter and a plurality of additional long-pass interference filters, the long-pass interference filter and the plurality of additional long-pass interference filters configured to be interchangeably positioned between the light source and the first sample detector.

19. The monochromator of claim 18, wherein the filter assembly includes a rotatable filter wheel, the long-pass interference filter and the plurality of additional long-pass interference filters being disposed around the wheel.

20. A monochromator comprising:
    a housing;
    a light source positioned in the housing;
    a source mirror positioned to reflect light from the light source;
    an entrance slit positioned to pass through light reflected by the source mirror;
    a first monochromator mirror positioned to reflect light passed through the entrance slit;
    a diffractive surface positioned to receive and diffract light reflected by the first monochromator mirror;
    a second monochromator mirror positioned to reflect light diffracted by the diffractive surface;
    an exit slit positioned to pass through light reflected by the second monochromator mirror;
    a sample mirror positioned to reflect light passed through the exit slit;
    a cuvette positioned to pass through light reflected by the sample mirror;
    a long-pass interference filter positioned to receive light from the light source, reflect light that has a wavelength below a selected value, and pass through light having a wavelength above the selected value; and
    a first sample detector positioned to receive light reflected by the long-pass interference filter.

21. The monochromator of claim 20, further comprising a second reference detector positioned to receive light passed through the reference long-pass interference filter.

22. The monochromator of claim 20, wherein the long-pass interference filter is positioned between the cuvette and the first sample detector.

23. The monochromator of claim 20, wherein the long-pass interference filter is positioned between the light source and the entrance slit.

24. The monochromator of claim 20, further comprising:
   a beam splitter positioned to receive light passed through the exit slit;
   a first reference detector positioned to receive light reflected by the beam splitter;
   a reference cuvette positioned between the beam splitter and the first reference detector; and
   a reference lens positioned between the beam splitter and the first reference detector.

25. The monochromator of claim 24, further comprising a reference long-pass interference filter positioned between the beam splitter and the first reference detector.

26. The monochromator of claim 24, further comprising a second reference detector positioned to receive light passed through the reference long-pass interference filter.

\* \* \* \* \*